US005253580A

United States Patent [19]

Dee et al.

[11] Patent Number: 5,253,580

[45] Date of Patent: Oct. 19, 1993

[54] APPARATUS FOR CONVEYING A PRINTED OBJECT

[76] Inventors: Richard D. Dee, 921 W. Macada Rd., Bethlehem, Pa. 18017; Louis A. DiGiacomo, 600 Orchid Cir., Emmaus, Pa. 18049; Geza Tomosy, 3900 Fish Hatchery Rd., Allentown, Pa. 18103

[21] Appl. No.: 934,380

[22] Filed: Aug. 24, 1992

[51] Int. Cl.$^5$ .............................................. B65G 29/00

[52] U.S. Cl. .................................. 101/40.1; 198/441; 198/471.1

[58] Field of Search .................... 101/35, 36, 37, 38.1, 101/39, 40, 40.1, 43, 44; 198/438, 441, 471.1, 689.1, 803.5

[56] References Cited

U.S. PATENT DOCUMENTS

| | | | |
|---|---|---|---|
| 3,802,547 | 4/1974 | Wagers, Jr. et al. | 198/471.1 |
| 3,850,096 | 11/1974 | Taniguchi | 101/40 |
| 3,863,753 | 2/1975 | Shank, Jr. | 101/40 |
| 4,445,431 | 5/1984 | Stirbis | 101/40 |
| 4,505,198 | 3/1985 | Dee et al. | 101/40 |
| 4,722,271 | 2/1988 | Tielroy | 101/39 |
| 4,771,879 | 9/1988 | Shriver | 101/40 |

*Primary Examiner*—Edgar S. Burr
*Assistant Examiner*—Stephen R. Funk
*Attorney, Agent, or Firm*—James D. Dee

[57] ABSTRACT

This invention relates to an apparatus and process for conveying a printed object, such as a printed bottle. The apparatus comprises a vacuum pump for supplying a vacuum and a rotationally driven central shaft operably associated with the vacuum pump. The central shaft has a bore therethrough for carrying a vacuum. A rotary disc is mounted on the central shaft for rotation therewith for conveying the printed object sequentially from a receipt station to a discharge station. The rotary disc has a front face, a back face and an internal vacuum chamber for carrying a vacuum. The internal vacuum chamber is in communication with the central shaft's bore and the vacuum pump. Additionally, the front face has at least one vacuum port. A valve system is preferably associated with the vacuum port for controlling the delivery of the vacuum to the vacuum port so that suction created by the vacuum picks-up the object at the receipt station. This apparatus can be associated with a screen printing device for supplying the printed object to the receipt station. The apparatus can also include a device for drying or curing ink on the printed object while the object is being conveyed by the rotary disc from the receipt station to the discharge station.

8 Claims, 4 Drawing Sheets

APPARATUS FOR CONVEYING A PRINTED OBJECT

BACKGROUND OF THE INVENTION

1. Field of the Invention

This invention generally relates to conveying printed objects and, more particularly, to conveying printed bottles supplied from a printing device.

2. Description of the Prior Art

Printing methods, such as screen printing, generally involve the transfer of a pattern which corresponds to informative or decorative material to the surface of an object, such as a bottle. These printing methods utilize various devices for automatically taking-off and conveying the printed and still wet objects from the printers to dryers. However, these automatic takeoff devices are usually designed around the same basic engineering premise, i.e. that the bottles are individually chucked, printed, released, advanced, and finally picked up to be deposited on the conveyor belt of a dryer or dropped into moving "banana boats" for drying. The printing cycles are predictably uniform, thus the coordination between the printer and the dryer is routine engineering.

In U.S. Pat. No. 4,505,198, entitled "Apparatus and Method for Applying Printed Material to a Cylindrical Object," the applicants of the present invention described therein a new concept for printing cylindrical objects, such as bottles. It operates without a squeegee and without the need for chucking. While this system achieves its intended goal of unprecedented printing speed, its full utilization depends on the ability to provide a conveying and drying or curing system capable of achieving a similarly fast speed. The output rate of this printer is not predictably uniform because it depends on the rate of feed, which can be automatic or manual. The fact that the object is rolling freely without being chucked, adds to the timing problem. Accordingly, there remains a need in the art for a suitable conveying apparatus and method for receiving and holding printed and still wet objects arriving at a receiving station one by one at a random rate, then picking them up and conveying them through the drying or curing process, and finally ejecting them at a discharge station. The apparatus and process for conveying a printed object in accordance with the present invention provides such a system.

SUMMARY OF THE INVENTION

This invention relates to an apparatus and process for conveying a printed object, such as a printed bottle. The apparatus comprises a vacuum means for supplying a vacuum and a rotationally driven central shaft operably associated with the vacuum means. The central shaft has a bore therethrough for carrying a vacuum. A rotary disc means is mounted on the central shaft for rotation therewith for conveying the printed object sequentially from a receipt station to a discharge station. The rotary disc means has a front face, a back face and an internal vacuum chamber for carrying a vacuum. The internal vacuum chamber is in communication with the central shaft's bore and the vacuum means. Additionally, the front face has at least one vacuum port. The vacuum is delivered to the vacuum port so that suction created by the vacuum picks-up the object at the receipt station. In a preferred embodiment, a valve means is associated with the vacuum port for controlling the delivery of the vacuum to the vacuum port so that the suction created by the vacuum picks-up the object at the receipt station.

This apparatus can be associated with a screen printing device for supplying the printed object to the receipt station. The apparatus can also include a means for drying or curing ink on the printed object while the object is being conveyed by the rotary disc means from the receipt station to the discharge station. For example, the apparatus can be further comprised of a means for radiating ultra-violet light for curing ink on the printed object while the object is being conveyed by the rotary disc means from the receipt station to the discharge station. The apparatus can also be further comprised of a power drive means for rotating the central shaft and the rotary disc means.

The present invention provides a unique takeoff and conveying apparatus, which is suitable for receiving and holding printed and still wet objects arriving at a receiving station one by one at a random rate, then picked up and carried through the drying or curing process, and finally ejected. This invention is capable of conveying the printed objects from automatic printing devices at rapid speeds, such as 3 or 4 objects per second, which are unobtainable with known devices. This invention also requires only one receiving station, such as a "banana boat" type receiving station, unlike prior art devices which require multiple "banana boat" receiving stations. Moreover, the present invention is compact and requires much less space in a printing operation than known takeoff devices utilizing conveyor belts.

Accordingly, it is an object of the present invention to provide an apparatus and process for conveying a printed object, such as a bottle. It is a further object of the present invention to provide a conveying apparatus which is suitable for receiving and holding printed and still wet objects arriving at a receiving station one by one at a random rate, then picking them up and carrying them through the drying or curing process, and finally ejecting the objects. It is also an object of the present invention to provide an apparatus that is capable of conveying printed objects from automatic printing devices at rapid speeds. It is an additional object of the present invention to provide a conveying apparatus which requires only one receiving station. Furthermore, it is an object of the present invention to provide a conveying apparatus that is compact.

These and many other objects, features and advantages of the present invention will become apparent to those skilled in the art when the following description of the preferred embodiments is read in conjunction with the drawings appended hereto.

BRIEF DESCRIPTION OF THE DRAWINGS

In the drawings, where like reference numerals refer to like elements throughout.

DESCRIPTION OF THE PREFERRED EMBODIMENTS

Figure 1:
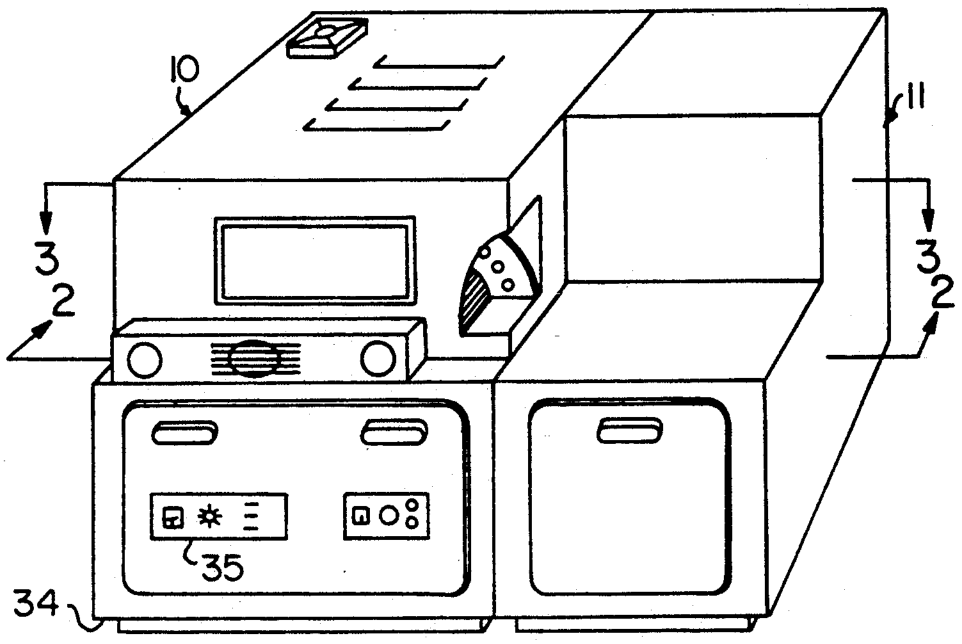
FIG. 1 is a frontal view of the apparatus for conveying printed objects in accordance with the present invention, also illustrating a screen printing apparatus for supplying the printed objects.
Figure 2:
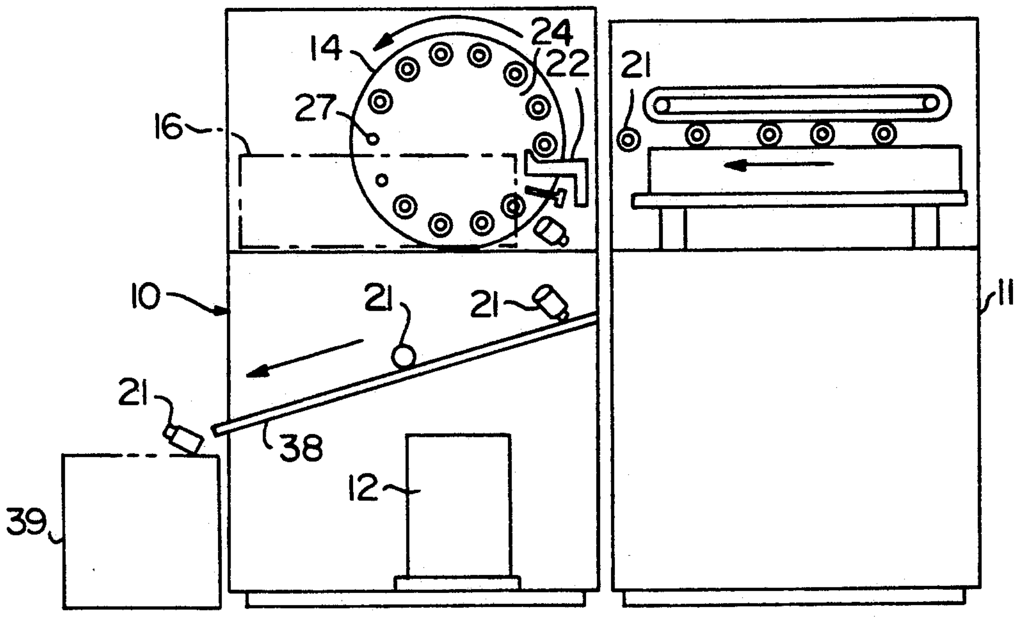
FIG. 2 is a sectional view of the apparatus taken along the line 2—2 in FIG. 1.
Figure 3:
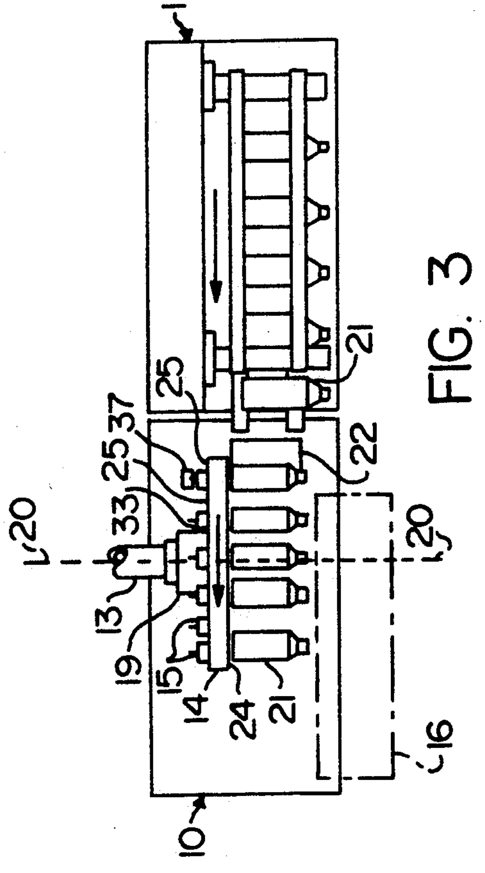
FIG. 3 is a sectional view of the apparatus taken along the line 3—3 in FIG. 1.

Referring now to the drawings, FIGS. 1-3 illustrate a embodiment of an apparatus 10 for conveying printed objects, such as bottles, in accordance with the present invention and a screen printing device 11 associated therewith for supplying the printed objects. The conveying apparatus 10 has a vacuum means 12, a rotationally driven central shaft 13, a rotary disc 14, and an air valve system 15. Preferably, the apparatus 10 further has a means 16 for drying or curing ink on the printed bottle. Such an apparatus 10 is generally supported on some type of frame 34. A control panel 35 for regulating the functions of the apparatus 10 can be included on the frame 34 or located separate from the rest of the apparatus 10.

The vacuum means 12 is provided for supplying a vacuum. Any suitable type of vacuum pump known in the art can be utilized for the vacuum means 12. The rotationally driven central shaft 13 is operably connected to the vacuum means 12 at one end of the shaft 13 by a rotatable seal 17 and tubing 18 arrangement, and it is supported on bearings 19, so that the shaft 13 is capable of rotating without releasing the vacuum supplied by the vacuum means 12. Of course, the central shaft 13 has a bore therethrough for carrying the vacuum.

The rotary disc 14 is mounted on the shaft's rotational axis 20 on the end of the central shaft 13 opposite from the vacuum means 12. The disc 14 is mounted for rotation with the shaft 13 for conveying the printed bottle 21 from a receipt station 22 to a discharge station 23. Any suitable power drive means or drive mechanism (not illustrated) known in the art can be used to rotate the central shaft 13 and rotary disc 14.

Figure 4:
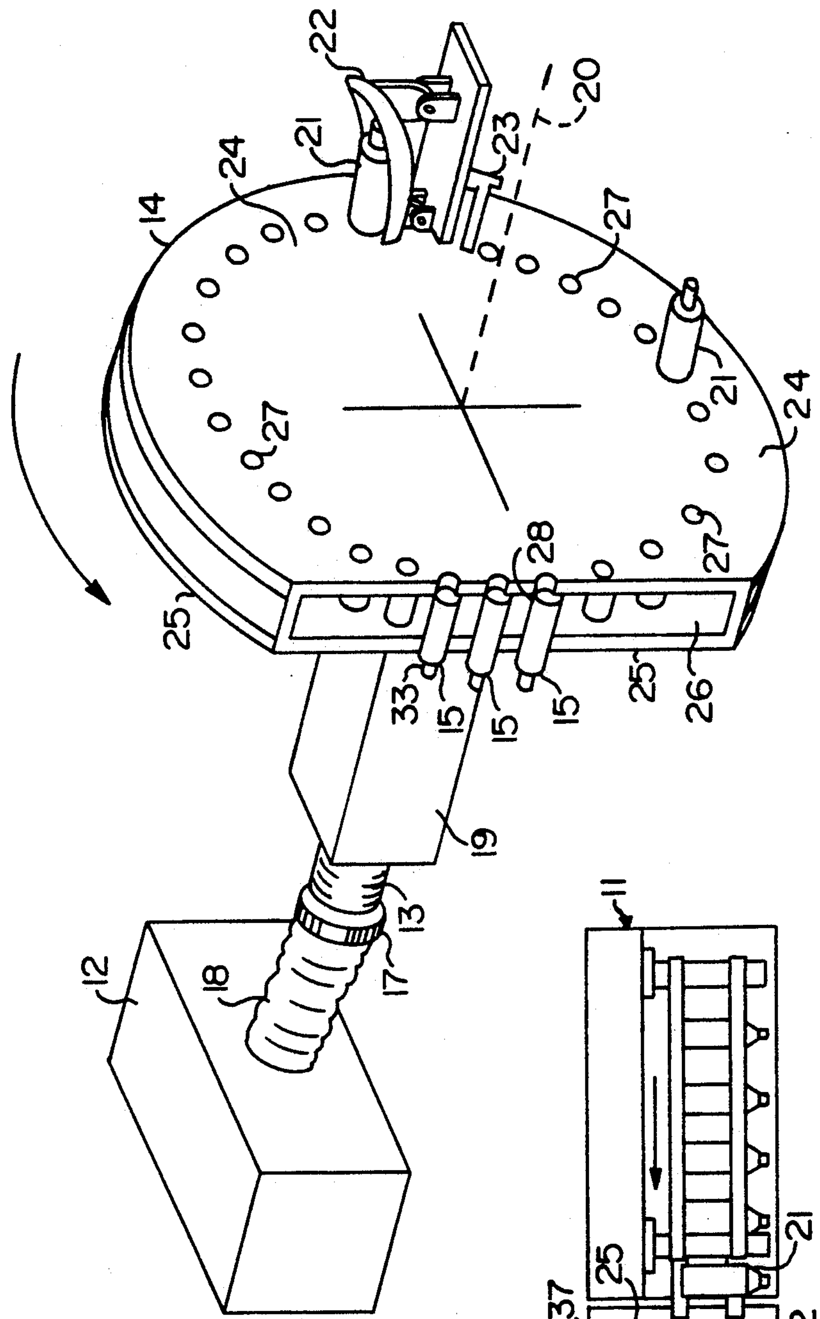
FIG. 4 is an enlarged, detailed view of the preferred embodiment of an apparatus in accordance with the present invention, with the rotary disc being partially cutaway to more clearly illustrate the air valve system.

The rotary disc 14 has a front face 24, a back face 25 and an internal vacuum chamber 26 for carrying the vacuum. The internal vacuum chamber 26 is in communication with the central shaft's 13 bore and the vacuum means 12. The disc's front face 24 has a plurality of vacuum ports 27 evenly spaced on the disc's front face 24 in a circle concentric with the disc's and shaft's rotational axis 20, as illustrated in FIG. 4. Preferably, each of the vacuum ports 27 is a circular aperture having a diameter less than the diameter of the base 36 of the bottle 21. The receipt station 22 aligns the printed bottle 21 so that suction created by the vacuum is applied to the bottle's base 36, which is advantageously generally flat, when the bottle 21 is picked-up at the receipt station 22 and the discharge station 23 removes the bottle 21 from the disc's front face 24.

Figure 5:
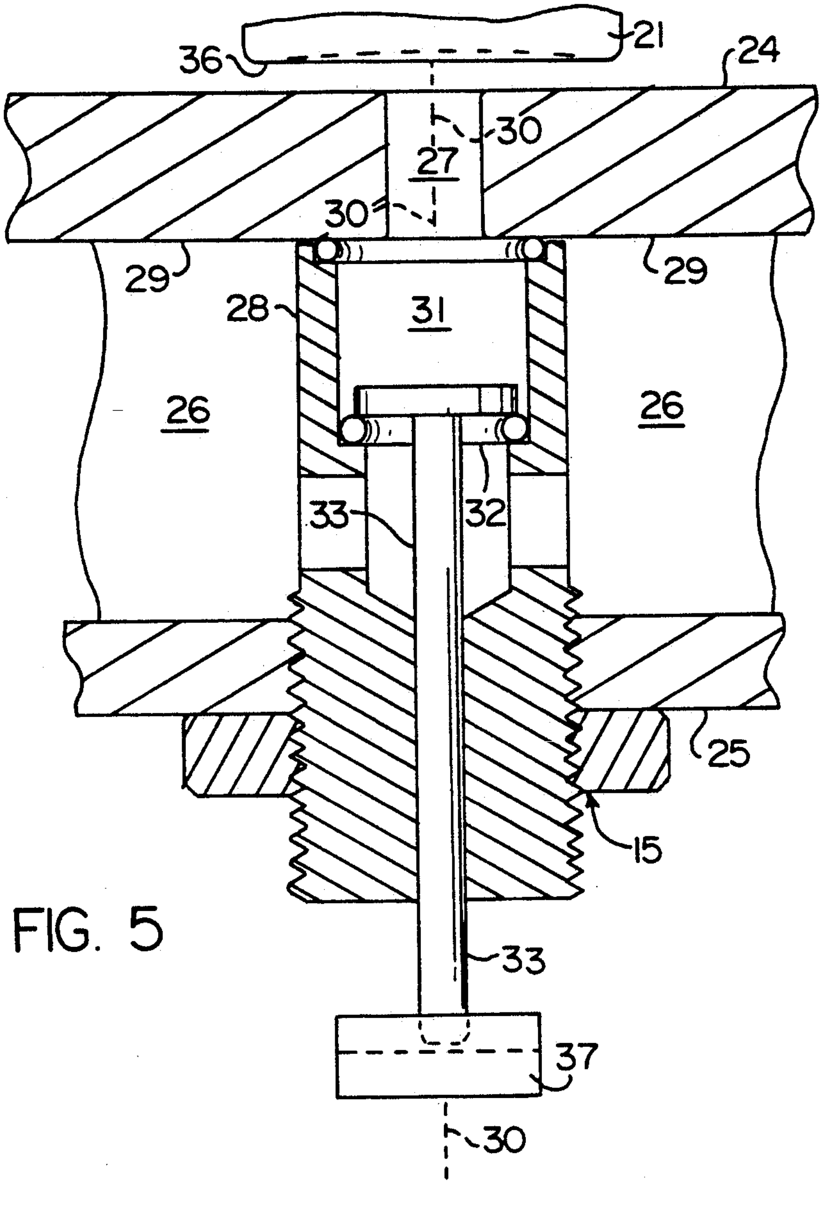
FIG. 5 is an enlarged, sectional view of the preferred embodiment of an air valve in accordance with the present invention.
Figure 6:
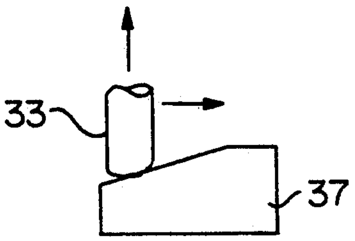
FIG. 6 is an enlarged view of the stationary cam in accordance with the present invention.
Figure 7:
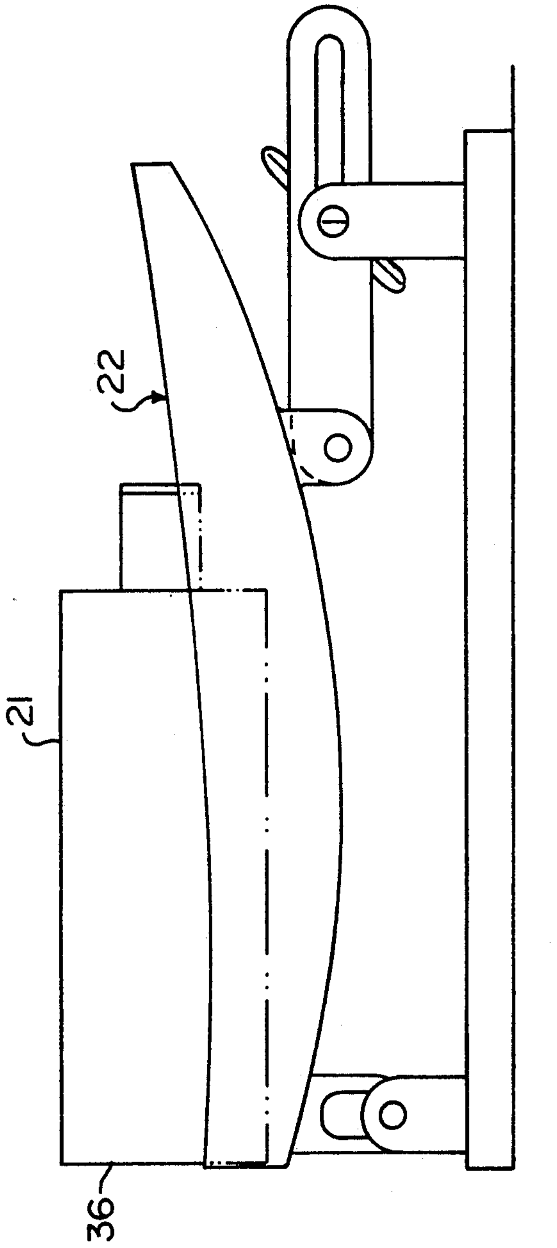
FIG. 7 is an enlarged view of the preferred embodiment of a receipt station with a bottle in accordance with the present invention.

An air valve system 15 is preferably associated with each of the vacuum ports 27 for controlling the delivery of the vacuum to the vacuum port 27 so that suction created by the vacuum picks-up the bottle 21 at the receipt station 22 and termination of the vacuum occurs at the discharge station 23 where the bottle 21 is dropped-off. As illustrated in FIGS. 4-5, the air valve system 15 is comprised of a cylinder 28 mounted in the rotary disc's internal vacuum chamber 26 so that the cylinder 28 is attached to the interior 29 of the disc's front face 24, and extends through the chamber 26 and the disc's back face 25, with the cylinder's axis 30 being aligned with the vacuum port 27 parallel to the disc's and shaft's rotational axis 20.

The cylinder 28 has a cavity 31 in communication with the vacuum port 27 and a valve 32 disposed in the cavity 31. The valve 32 is movable to open and close the chamber 26 in relation to the cavity 31. The valve 32 has a stem 33 extending through the cylinder 28 and protruding outwardly beyond the disc's back face 25 whereby depression of the valve's stem 33 at the receipt station 22 moves the valve 32 to open the cavity 31 so that the cavity 31 is in communication with the internal vacuum chamber 26 thereby creating sufficient suction to retain the bottle 21 against the disc's front face 24 at the vacuum port 27 and removal of the bottle 21 at the discharge station 23 creates movement of the valve 32 to close the cavity 31 so that the cavity 31 is no longer in communication with the internal vacuum chamber 26.

The rotary disc 14 of a preferred embodiment of the present invention is approximately 2 feet in diameter and 2-3 inches in width and is mounted to rotate around the rotational axis 20. Further, the central shaft 13 protrudes perpendicularly from the disc's back face 25. The front face 24 of the disc has vacuum ports 27 which are circular apertures approximately 3/16 inches in diameter and 1.5-2.0 inches apart, arranged in a circle on the front face 24 with the circle centered on the rotational axis 20, as illustrated in FIG. 4. The vacuum ports 27 are arranged so as to provide an uninterrupted surface area immediately around each of the ports 27 so that adequate suction is maintained when a bottle 21 is picked-up.

The receipt station 22 is positioned in close proximity to the disc's front face 24. The printed bottle 21, coming from the screen printing device 11, falls into a concave recess of the receipt station 22. The receipt station 22 serves to receive the arriving printed and still wet bottle 21 and align it perpendicularly to the disc's front face 24 so that the base 36 of the bottle 21 lays at a close distance (preferably about ⅛") and parallel to the front face 24. The center line of the bottle 21 will then lineup with the vacuum ports 27 arranged in the circle on the front face 24. Advantageously, the printed bottle 21 has a generally flat base 36 and the receipt station 22 aligns the bottle 21 so that suction created by the vacuum is readily applied to the bottle's flat base 36 when the bottle 21 is picked-up at the receipt station 22.

The present inventors have found that a vacuum of at least 5 inches of mercury delivered to each of the vacuum ports 27 is sufficient so that suction created by the vacuum picks-up the bottle 21 at the receipt station 22. Nevertheless, if the disc's front face 24 has many vacuum ports 27, such as approximately forty, and the ports 27 were left constantly open, the vacuum may be adversely affected resulting in a low vacuum level which is unusable. Therefore, on the disc's back face 25, an air valve system 15 is provided for each of the vacuum ports 27 on the disc's front face 24. The valves 32 are free to move to open or close the air valve cylinder cavities 31 if force is applied. When the vacuum is turned on, air rushes in through the vacuum ports 27 and forces all the air valves 32 of the system 15 to close.

However, the apparatus further has a stationary cam 37 operably associated with the receipt station 22. The cam 37 is positioned so that rotation of the rotary disc 14 results in depression of each valve's stem 33 when the stem 33 is aligned with the receipt station 22 resulting in the air valve cylinder's cavity 31 being opened and in communication with the disc's internal vacuum chamber 26, thereby creating sufficient suction to retain the bottle 21 at the receipt station 22 against the disc's front face 24 at the vacuum port 27. More particularly, the vacuum through the port 27 on the disc's front face 24 will depressurize the space between the disc's front face 24 and the bottle's base 36 causing the atmospheric pressure to force the bottle's base 36 against the disc's front face 24, thus covering the port 27 and maintaining a hold on the bottle 21. As the disc 14 rotates, the bottle 21 will be lifted out of the receipt station 22 and will be conveyed around by the rotary disc 14 from the receipt station 22 to the discharge station 23.

As the disc 14 continues to rotate, the discharge station 23 causes the engaged bottle 21 to slide outwardly on the disc's front face 24 until the respective vacuum port 27 is uncovered to consequently release the bottle 21 from engagement with the front face 24. The released bottle 21 can then fall into a properly slanted exit chute 38 to slide out of the apparatus 10 by gravity into a collection box 39, as illustrated in FIG. 2. In a preferred embodiment, the discharge station 23 is merely a metal bar, about ¼ inch in diameter and 3 inches long, mounted to the frame 34 of the apparatus 10, positioned parallel and at an oblique angle to the radius of the front face 24. When the bottom extremity of the bottle 21 comes in contact with the metal bar, the bottle 21 will slide alongside the bar until the vacuum port 27 is uncovered, and the bottle will be released.

The preferred embodiment also includes a means 16 for drying or curing the ink on the printed bottle 21 while the bottle 21 is being conveyed by the rotary disc 14 from the receipt station 22 to the discharge station 23. The means 16 for drying or curing the ink on the printed bottle 21 is preferably an ultra-violet device of the type known in the art, which is capable of radiating ultra-violet light so that the ink on the printed bottle 21 is cured while the bottle 21 is conveyed by the rotary disc 14 from the receipt station 22 to the discharge station 23. Additionally, the apparatus can further include any appropriate means known in the art for automatically introducing a plurality of the printed bottles 21 supplied from the screen printing device 11 sequentially to the receipt station 22. Moreover, the present invention can be advantageously used with a high output screen printing device such as the type described in U.S. Pat. No. 4,505,198, the disclosure of which is incorporated by reference herein.

In another embodiment, the present invention also relates to the process for conveying the printed bottle comprising: supplying the printed bottle from the printing device to the receipt station; delivering a vacuum from a vacuum source to a plurality of vacuum ports on the front face of the rotary disc mounted on the central shaft; controlling the delivery of the vacuum to each of the vacuum ports so that suction created by the vacuum picks-up the bottle at the receipt station; rotating the central shaft and rotary disc so that the bottle is conveyed from the receipt station to the discharge station; and drying or curing ink on the printed bottle while the bottle is being conveyed by the rotary disc from the receipt station to the discharge station.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. An apparatus for conveying a printed object comprising:

vacuum means for supplying a vacuum;

a rotationally driven central shaft operably associated with the vacuum means, said central shaft having a bore therethrough for carrying the vacuum;

rotary disc means mounted on the central shaft for rotation therewith for conveying the printed object sequentially from a receipt station to a discharge station, said rotary disc means having a front face, a back face and an internal vacuum chamber for carrying the vacuum, said internal vacuum chamber being in communication with the central shaft's bore and the vacuum means, said front face having at least one vacuum port;

wherein the vacuum is delivered to the vacuum port so that suction created by the vacuum picks-up the object at the receipt station;

a valve means associated with the vacuum port for controlling the delivery of the vacuum to the vacuum port so that suction crated by the vacuum picks-up the object at the receipt station; and wherein said valve means is an air valve system comprised of a cylinder mounted in the rotary disc means' internal vacuum chamber so that the cylinder is attached to an interior of the disc means' back face, and extends through the chamber and the disc means' back face, with the cylinder's axis being aligned with the vacuum port generally parallel to the disc means' rotational axis, said cylinder having a cavity in communication with the vacuum port and a valve disposed in said cavity, said valve having a stem extending through the cylinder and protruding outwardly beyond the disc means' back face whereby depression of the valve's stem at the receipt station opens said cavity to that the cavity is in communication with the internal vacuum chamber thereby creating sufficient suction to retain the object against the disc means' front face at the vacuum port.

2. An apparatus for conveying a printed bottle having a generally flat base supplied from a screen printing device comprising:

vacuum means for supplying a vacuum;

a rotationally driven central shaft operably connected to the vacuum means at one end of the shaft by a rotatable seal so that the shaft is capable of rotating without releasing the vacuum, said central shaft having a bore therethrough for carrying the vacuum;

a rotary disc mounted on the shaft's rotational axis on the opposite end of the central shaft for rotation therewith for conveying the printed bottle from a receipt station to a discharge station, said rotary disc having a front face, a back face and an internal vacuum chamber for carrying the vacuum, said internal vacuum chamber being in communication with the central shaft's bore and the vacuum means, said front face having a plurality of vacuum ports evenly spaced on the disc's front face in a circle concentric with the disc's rotational axis;

an air valve system associated with each of said vacuum ports for controlling the delivery of the vacuum to the vacuum port so that suction created by the vacuum picks-up the bottle at the receipt station and termination of the vacuum occurs at the discharge station where the bottle is dropped-off, said air valve system having a cylinder mounted in the rotary disc's internal vacuum chamber so that the cylinder is attached to an interior of the disc's front face, and extends through the chamber and the disc's back face, with the cylinder's axis being aligned with the vacuum port parallel to the disc's rotational axis, said cylinder having a cavity in communication with the vacuum port and a valve disposed in said cavity, said valve being movable to open and close the chamber in relation to the cavity, said valve having a stem extending through the cylinder and protruding outwardly beyond the disc's back face whereby depression of the valve's stem at the receipt station moves the valve to open the cavity so that the cavity is in communication with the internal vacuum chamber thereby creating sufficient suction to retain the bottle against the disc's front face at the vacuum port and removal of the bottle at the discharge station creates movement of the valve to close the cavity so that the cavity is no longer in communication with the internal vacuum chamber;

means for drying or curing ink on the printed bottle while the bottle is being conveyed by the rotary disc from the receipt station to the discharge station; and wherein said receipt station aligns the bottle so that suction created by the vacuum is applied to the bottle's generally flat base when the bottle is picked-up at the receipt station and said discharge station removes the bottle from the disc's front face.

3. The apparatus in accordance with claim 2 wherein said means for drying or curing the ink on the printed bottle is an ultraviolet device capable of radiating ultraviolet light so that the ink on the printed bottle is cured while the bottle is conveyed by the rotary disc from the receipt station to the discharge station.

4. The apparatus in accordance with claim 2 further comprising power drive means for rotating the central shaft and the rotary disc.

5. The apparatus in accordance with claim 2 wherein each of said vacuum ports is a circular aperture having a diameter less than the diameter of the base of the bottle.

6. The apparatus in accordance with claim 2 wherein the vacuum of at least 5 inches of mercury is delivered to each of said vacuum ports so that suction created by the vacuum picks-up the bottle at the receipt station.

7. The apparatus in accordance with claim 2 further comprising a stationary cam operably associated with the receipt station, rotation of said rotary disc resulting in depression of each air valve's valve stem when the stem is aligned with the receipt station so that the air valve cylinder's cavity is opened and in communication with the disc's internal vacuum chamber thereby creating sufficient suction to retain the bottle at the receipt station against the disc's front face at the vacuum port.

8. The apparatus in accordance with claim 2 further comprising a means for automatically introducing a plurality of the printed bottles supplied from the screen printing device sequentially to the receipt station.

* * * * *